Figure 1:
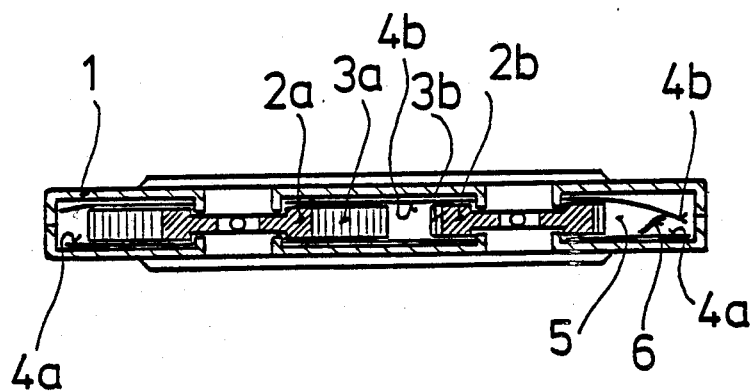

United States Patent [19]

Schoettle et al.

[11] Patent Number: 4,624,423

[45] Date of Patent: Nov. 25, 1986

[54] TAPE CASSETTE WITH LINER

[75] Inventors: Klaus Schoettle, Heidelberg; Roland Sold, Mutterstadt; Uwe Brinkmann, Kehl; Werner Wagner, Oberkirch, all of Fed. Rep. of Germany

[73] Assignee: BASF Aktiengesellschaft, Ludwigshafen, Fed. Rep. of Germany

[21] Appl. No.: 734,181

[22] Filed: May 15, 1985

[30] Foreign Application Priority Data

May 19, 1984 [DE] Fed. Rep. of Germany ... 8415333[U]

[51] Int. Cl.⁴ .................... G11B 23/04; G11B 23/08
[52] U.S. Cl. .................... 242/199; 206/387; 206/389; 206/393; 229/1.5 R; 242/197
[58] Field of Search .................... 242/194, 197–200; 206/387, 389, 391, 393, 395, 396; 229/1.5 R

[56] References Cited

U.S. PATENT DOCUMENTS

| | | | |
|---|---|---|---|
| 3,675,875 | 7/1972 | Schmidt | 242/199 |
| 3,851,841 | 12/1974 | Bastiaans | 242/199 |
| 4,102,515 | 7/1978 | Milants | 242/199 |
| 4,127,242 | 11/1978 | Hashimoto et al. | 242/199 |
| 4,128,212 | 12/1978 | Hioki | 242/199 |
| 4,174,080 | 11/1979 | Yamada | 242/199 |
| 4,289,285 | 9/1981 | Ishida et al. | 242/199 |
| 4,328,936 | 5/1982 | Bordignon | 242/199 |
| 4,438,892 | 3/1984 | Fitterer et al. | 242/199 |
| 4,458,858 | 7/1984 | Nelson | 242/199 |
| 4,466,036 | 8/1984 | Ishida et al. | 242/199 X |
| 4,506,846 | 3/1985 | Gelardi et al. | 242/199 |
| 4,516,181 | 5/1985 | Shirako | 242/199 X |

FOREIGN PATENT DOCUMENTS 2114934 9/1983 United Kingdom .

Primary Examiner—John Petrakes
Attorney, Agent, or Firm—Keil & Weinkauf

[57] ABSTRACT

A support liner (20) for a magnetic tape cassette comprises a coherent double liner whose individual liner parts (20a and 20b) are supported against the inner walls of the cassette to provide a cushioned support for tape rolls of the cassette.

15 Claims, 4 Drawing Figures

TAPE CASSETTE WITH LINER

The present invention relates to a magnetic tape cassette, in particular a compact cassette, of the kind comprising a housing having upper and lower walls, at least one roll of magnetic tape within the housing onto which the magnetic tape can be wound or from which the magnetic tape can be unwound, a first liner part arranged between said at least one roll of magnetic tape and said upper wall of the housing and a second liner part arranged between said at least one roll of magnetic tape and said lower wall of the housing, the said first and second lining parts being connected together. The invention also relates to a support liner for such a cassette.

U.S. Pat. No. 3,851,841 discloses support liners for a compact cassette, extensions being provided on each liner which face the middle of the back of the cassette and are connected to one another. The connected extensions of the two liners pass through a recess in the back wall of the cassette to the outside of the cassette, so that a grounding spring can be used to prevent the liners, which are provided with conductive metal, from becoming electro-statically charged. The extensions are located between the rolls of tape and therefore have no tape or roll guide function.

Teflon liners in compact cassettes are known. These liners are curved in the middle section, the curvature being directed toward the rolls of tape, and the edges of the liners being supported against the inner walls of the cassette. If they do not have an expensive sandwich-type structure as in, for example, British Pat. No. 2,114,934 and German Laid-Open Application DOS No. 2,501,914, these conventional liners have the disadvantage that, owing to their own weight, they bend into the free roll space on the side containing the incomplete roll of tape when the cassette is operated in the horizontal position, and consequently put a stress on the magnetic tape, in particular thin magnetic tape, and cause it to bend over so that it passes between the hub or roll of tape and the inner walls of the cassette during operation, which leads to jamming of the cassette, thereby rendering it useless.

It is an object of the present invention to provide a simple and effective support liner which also has economic advantages in the production and assembly of magnetic tape cassettes.

We have found that this object is achieved by a magnetic tape cassette, in particular a compact cassette, comprising a housing having upper and lower walls, at least one roll of magnetic tape within the housing onto which the magnetic tape can be wound or from which the magnetic tape can be unwound, a first liner part arranged between said at least one roll of magnetic tape and said upper wall of the housing and a second liner part arranged between said at least one roll of magnetic tape and said lower wall of the housing, the said first and second lining parts being connected together, wherein the liner parts are connected to one another along adjacent peripheral edges, and wherein each liner part is provided with bearing means which support each liner part against its associated upper or lower wall of the housing so that a cushion form is produced on each side of said at least one roll of magnetic tape.

This gives a double liner which is simple to insert into the cassette, provides good support in the particular predetermined cassette interior, and very substantially retains a support form or cushion form. Handling double liner instead of two individual liners has advantages in the assembly of the cassette.

In another practical embodiment, the bearing means can be in the form of raised, e.g. arched, edges at the peripheral edges, making liner manufacture simple and efficient.

Furthermore, raised bearing parts are provided on the double liner, around at least one drive spindle opening. Of course, the novel liner possesses the properties described above even without these special raised bearing parts.

Preferably, the liner parts are connected, e.g. by a connecting part, close to the back wall of the cassette.

Figure 2:
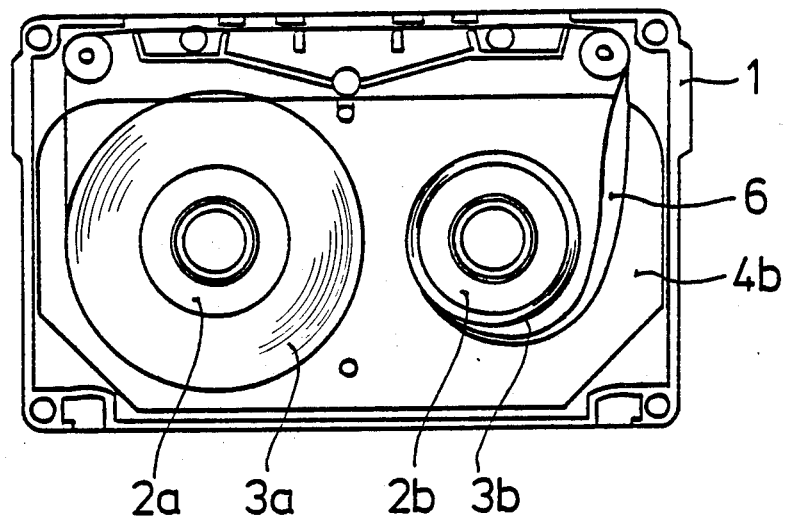
Figure 3:
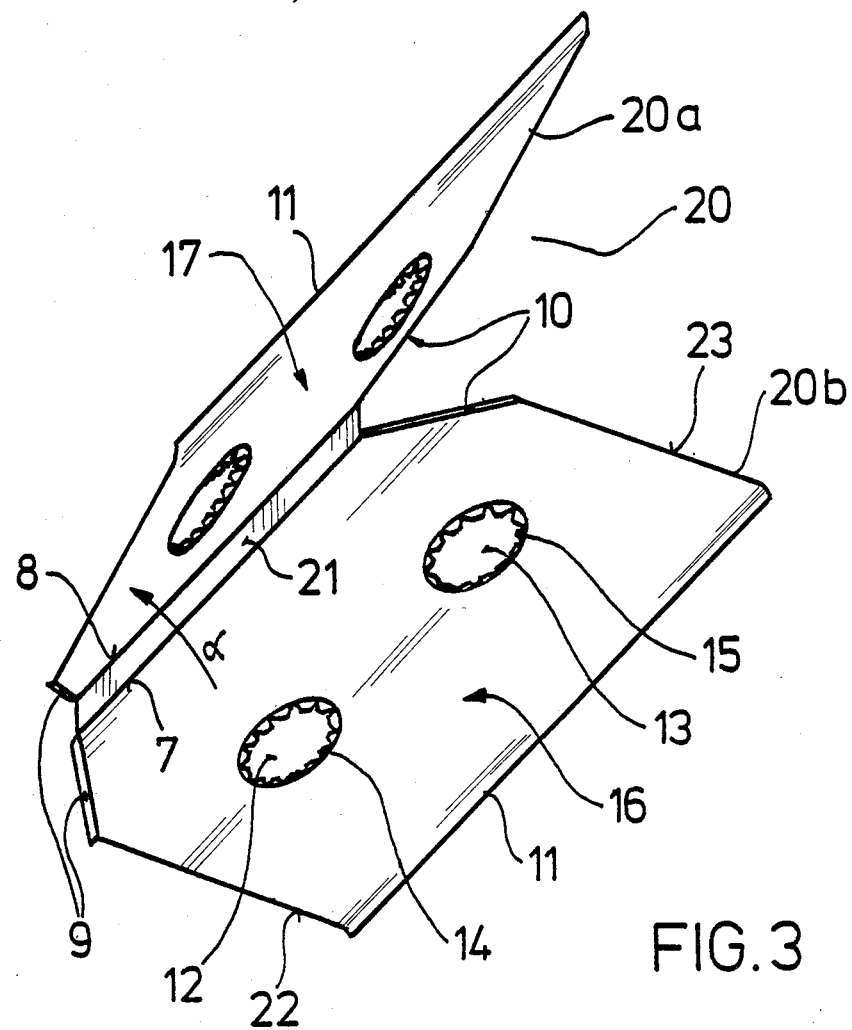
Figure 4:
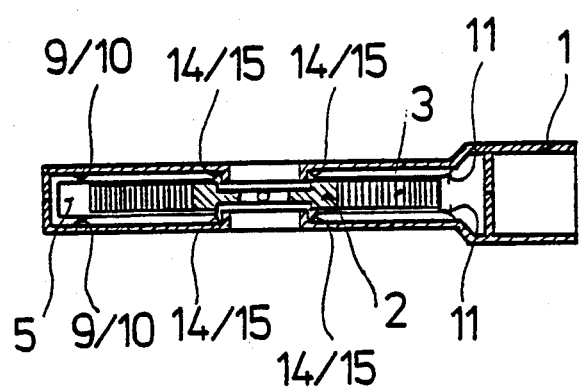

Embodiments of the invention will now be described, by way of example, with reference to the accompanying drawings, in which:

FIGS. 1 and 2 show a conventional compact cassette in sectional view and in plan, respectively, FIG. 3 shows a perspective view of a support liner according to the invention, and FIG. 4 shows a sectional view of a magnetic tape cassette incorporating the support liner of FIG. 3.

In FIG. 1 there is shown a conventional compact cassette 1 containing rotatable hubs 2a and 2b with rolls of magnetic tape 3a and 3b wound thereon. Support liners 4a and 4b are arranged below and above the hubs and rolls of tape, the lower liner 4a being fairly flat owing to the weight of the virtually full roll of tape 3a, and the upper liner 4b arching into the roll space 5 of the cassette 1 and thus being able to bend or twist the magnetic tape 6 so that the tape may subsequently slip off the roll and the roll or rolls may jam. FIG. 2 shows the cassette 1 with the lower part removed, the bent-over tape section being recognizable.

The double liner 20 according to the invention is preferably a single piece with first and second liner parts 20a and 20b connected by a back strip 21 which is formed by bent edges 7 and 8 and the width of which should be no less than the tape width. The angle α between inner surfaces 16 and 17 of the liner can be from about 20° to about 60°, in order to produce initial tension after insertion into the cassette 1. A connecting part according to the invention may also be a single fold in the liner parts. According to the invention, the other peripheral edges 9 to 11, and possibly also the lateral edges 22 and 23, should be in the form of support or bearing elements, e.g. raised bearing edges, preferably arched edges. Moreover, bent-out or impressed support parts, e.g. supporting teeth 14 and 15, can be provided as support elements around openings 12 and 13 for the drive spindles, in order to improve the support form or cushion form of each individual liner part and thus provide a defined roll space 5 between the individual liners, under spring load. The support or cushion form of each liner produces a cushion element at each side of the roll or rolls of tape.

Advantageously, the bent edges 7 and 8 should be produced, for example by suitable cold forming or hot forming methods in conjunction with suitable materials, so that a tension is generated. This tension which is then present in the edges 7 and 8 is transferred to the support surfaces 16 and 17 of the double liner 20 when the latter is inserted into the cassette 1, so that the tensile forces are directed outward toward the inner surface of the bottom and of the lid, and the support form of each liner part and hence also the roll space 5 are essentially maintained.

These tensile forces are also maintained when the edges 7 and 8 of the double liner 20 are relaxed as a result of the effects of temperature and time. In this case, too, the support parts or arched edges 9, 10, 11, 14 and 15 therefore ensure that the roll space 5 maintains a substantially constant form.

The height of the support elements is preferably equal to, or slightly greater than or less than, half the difference between the internal height of the cassette between the upper and lower walls of the housing and the width of the tape roll or hub plus twice the thickness of the liner material. In FIG. 3, the connecting part is a back strip 21 whose height is roughly equal to the internal dimensions of the cassette minus twice the height of the support elements.

The double liner 20 can be provided with a friction-reducing and/or antistatic coating on the support surfaces 16 and 17.

It is also possible for the liner parts 16 and 17 to be provided with interlocking elements (not shown), e.g. projection/indentation, close to their free front edges (arched edges 11), e.g. in the middle, in order to permit the liner parts to be connected after the roll or rolls of tape have been inserted. The height of, for example, the back strip must be retained in order to form a double cushion element connected at the longitudinal sides.

FIG. 4 shows a transverse cross-section through the support forms of the double liner 20 and their advantageous effects in preventing the position of the rolls of tape 3 from changing, the position of the said rolls essentially being independent of whether the rolls of tape 3 are fully wound or the hubs 2 are empty.

It is also possible for each of the liner parts 16 and 17 to be in the form of a gas-filled hollow element, whose height can correspond to that of the support elements. The latter can then be omitted.

We claim:

1. A magnetic tape cassette, in particular a compact cassette, comprising a housing having upper and lower walls, at least one roll of magnetic tape within the housing onto which the magnetic tape can be wound or from which the magnetic tape can be unwound, a first liner part arranged between said at least one roll of magnetic tape and said upper wall of the housing and a second liner part arranged between said at least one roll of magnetic tape and said lower wall of the housing, the said first and second liner parts being connected together, wherein the liner parts are connected to one another along adjacent peripheral edges, and wherein each liner part is provided with bearing means which support each liner part against its associated upper or lower wall of the housing so that a cushion form is produced on each side of said at least one roll of magnetic tape.

2. A cassette according to claim 1, wherein said adjacent peripheral edges comprise adjacent longitudinal peripheral edges.

3. A cassette according to claim 1, wherein said adjacent peripheral edges are connected together by means of a connecting part.

4. A cassette according to claim 1, wherein said adjacent peripheral edges are connected together along a fold.

5. A cassette according to claim 1, wherein the bearing means of each liner part comprise raised bearing portions at further peripheral edges of the liner part.

6. A cassette according to claim 5, wherein the said raised bearing portions at the peripheral edges are in the form of arched edges.

7. A cassette according to claim 5, wherein said bearing means of each liner part comprise further raised bearing portions around at least one drive spindle opening formed in the liner part.

8. A cassette according to claim 1, wherein said adjacent peripheral edges of the first and second liner parts are located close to a back wall of the cassette housing.

9. A cassette according to claim 1, wherein said adjacent peripheral edges are connected together by means of a connecting part which consists of a liner strip having a height corresponding at least approximately to the internal dimensions of the cassette between the said upper and lower walls of the housing minus twice the height of the bearing means.

10. For use in a magnetic tape cassette, in particular a compact cassette, of the type comprising a housing having upper and lower walls, and within the housing at least one roll of magnetic tape onto which the magnetic tape can be wound or from which the magnetic tape can be unwound,
a support liner having a first liner part for insertion between said at least one roll of magnetic tape and said upper wall of the housing, and a second liner part for insertion between said at least one roll of magnetic tape and said lower wall of the housing, said first and second liner parts being connected to each other along adjacent peripheral edges and each liner part being provided with bearing means for supporting the liner part against the associated upper or lower housing wall so that a cushion form is provided on each side of said at least one roll of magnetic tape.

11. For use in a magnetic tape cassette, in particular a compact cassette, of the type comprising a housing having upper and lower walls, and within the housing at least one roll of magnetic tape onto which the magnetic tape can be wound or from which the magnetic tape can be unwound,
a support liner having a first liner part for insertion between said at least one roll of magnetic tape and said upper wall of the housing, and a second liner part for insertion between said at least one roll of magnetic tape and said lower wall of the housing, said first and second liner parts each being in the form of a gas-filled hollow element of a height approximately equal to half of the difference between the inside of said upper and lower housing walls and the width of the tape roll, and said first and second liner parts being connected to each other, so that a cushion is formed on both sides of said at least one roll of magnetic tape.

12. A support liner according to claim 10, wherein said adjacent peripheral edges are longitudinal peripheral edges.

13. A support liner according to claim 10, wherein the bearing means of each liner part comprise raised bearing portions at further peripheral edges of the liner part.

14. A support liner according to claim 13, wherein the bearing portions are in the form of arched edges along said further peripheral edges.

15. A support liner according to claim 13, wherein said bearing means of each liner part comprise further raised portions around at least one drive spindle opening.

* * * * *